(12) United States Patent
Guelbenzu Michelena et al.

(10) Patent No.: US 8,500,969 B2
(45) Date of Patent: Aug. 6, 2013

(54) SYSTEM FOR PRODUCING ELECTRIC ENERGY AND HYDROGEN

(75) Inventors: Eugenio Guelbenzu Michelena, Sarriguren (ES); Javier Pérez Barbáchano, Sarriguren (ES)

(73) Assignees: Acciona Energia, S.A., Sarriguren (Navarra) (ES); Ingeteam Power Technology. S.A., Zamudio (Bizkaia) (ES)

( * ) Notice: Subject to any disclaimer, the term of this patent is extended or adjusted under 35 U.S.C. 154(b) by 198 days.

(21) Appl. No.: 12/738,099

(22) PCT Filed: Apr. 11, 2008

(86) PCT No.: PCT/ES2008/000228
§ 371 (c)(1), (2), (4) Date: Jun. 29, 2010

(87) PCT Pub. No.: WO2009/050311
PCT Pub. Date: Apr. 23, 2009

(65) Prior Publication Data
US 2010/0259102 A1    Oct. 14, 2010

(30) Foreign Application Priority Data

Oct. 18, 2007  (ES) .................................. 200702738

(51) Int. Cl.
*C25B 15/02*  (2006.01)
*C25B 1/04*  (2006.01)

(52) U.S. Cl.
USPC .................................... 204/230.2; 204/228.1

(58) Field of Classification Search
None
See application file for complete search history.

(56) References Cited

U.S. PATENT DOCUMENTS

| | | | |
|---|---|---|---|
| 7,199,482 B2* | 4/2007 | Hopewell ........................ | 290/44 |
| 7,233,079 B1 | 6/2007 | Cooper | |
| 7,510,640 B2* | 3/2009 | Gibson et al. ................. | 205/628 |
| 2003/0168864 A1 | 9/2003 | Heronemus et al. | |
| 2005/0121315 A1* | 6/2005 | Baltrucki et al. .......... | 204/228.4 |
| 2005/0178432 A1* | 8/2005 | Porter et al. .................... | 137/14 |
| 2006/0053792 A1 | 3/2006 | Bourgeois | |

FOREIGN PATENT DOCUMENTS

GB         149556         8/1920

OTHER PUBLICATIONS

Carrasco et al, Power-Electronic Systems for the Grid Integration of Renewable Energy Sources: A Survey, IEEE Transactions on Industrial Electronics, vol. 53, No. 4, Aug. 2006, pp. 1002-1016.*

(Continued)

*Primary Examiner* — Harry D Wilkins, III
(74) *Attorney, Agent, or Firm* — Wenderoth, Lind & Ponack, L.L.P.

(57) ABSTRACT

System for producing electric energy and hydrogen based on renewable energy sources, such as wind energy from one or several wind turbines, and incorporating means for producing hydrogen. The system comprises a hybrid electrolyzer device, which comprises a combination of at least two different electrolysis technologies and at least one control device, which manages the hydrogen production between the two electrolyzers of the different electrolysis technologies; being at least one electrolyzer of a rapid dynamics electrolysis technology type and, at least the second one of a substantially slower dynamics electrolysis technology type.

32 Claims, 9 Drawing Sheets

OTHER PUBLICATIONS

Faias et al, An Overview on Short and Long-Term Response Energy Storage Devices for Power Systems Applications, International Conference on Renewable Energies (ICREPQ 2008), Santander, Spain, Mar. 2008.*

Gandia et al, Renewable Hydrogen Production: Performance of an Alkaline Water Electrolyzer Working under Emulated Wind Conditions, Energy & Fuels, vol. 21, 2007, pp. 1699-1706.*

Harrison et al, Renewable Hydrogen: Integration, Validation and Demonstration, 2008 NHA Annual Hydrogen Conference, Sacramento, CA, Apr. 2008.*

Kreuter et al, ElectrolysisL The Important Energy Transformer in a World of Sustainable Energy, International Journal of Hydrogen Energy, vol. 23, No. 8, 1998, pp. 661-666.*

Kroposki, Renewable Electrolysis Integrated System Development and Testing, National Renewable Energy Laboratory, May 2006.*

Schoenung, Characteristics and Technologies for Long- vs. Short-Term Energy Storage, Sandia National Laboratories, Mar. 2001.*

Zeng et al, Use of Battery Energy Storage System to Improve the Power Quality and Stability of Wind Farms, International Conference on Power System Technology, 2006.*

Gorgun, "Dynamic modelling of a proton exchange membrane (PEM) electrolyzer", Internation Journal of Hydrogen Energy, vol. 31, pp. 29-38, 2006.*

International Search Report issued Sep. 2, 2008 in International (PCT) Application No. PCT/ES2008/000228.

S. A. Sherif et al., "Wind energy and the hydrogen economy—review of the technology", Solar Energy 78 (2005); Elsevier Ltd., Mar. 12, 2005, pp. 647-660.

K. Stunz et al., "Multilevel Energy Storage for Intermittent Wind Power Conversion: Computer System Analogies," Power Engineering Society General Meeting, 2005, IEEE, vol. 2, Digital Object Identifier 10.1109/PES.2005.1489328, Jun. 2005, pp. 1950-1951.

R. S. Garcia et al., "A wind-diesel system with hydrogen storage: Joint optimization of design and dispatch," Renewable Energy 31 (2006); Elsevier Ltd., (Jan. 4, 2006), pp. 2296-2320.

E. Kasseris et al., "Optimization of a wind-power fuel-cell hybrid system in an autonomous electrical network environment," Renewable Energy 32, Elsevier Ltd., Feb. 13, 2006, pp. 57-79.

* cited by examiner

SYSTEM FOR PRODUCING ELECTRIC ENERGY AND HYDROGEN

According to the title of the present specification, the following invention refers to a system for producing electric energy and hydrogen, based on the profitable use of wind energy produced by one or more wind turbines. Hydrogen production means (electrolyzers) are also included therein, in such a way that by including a hybrid device of electrolysis technologies the following is achieved: improve management of energy, enhance dynamic operation, an increase of the working life of the electrolyzers, and an increase of the profitability of the system, as well as an improvement of the quality of energy injected to the electricity network.

This system for producing electric energy and hydrogen can be adapted to any type of renewable energy or combination thereof.

FIELD OF APPLICATION

The present specification describes a system for producing electric energy and hydrogen that is useful in all type of wind turbines and wind farms, in such a way that hydrogen is produced by the hybridization of electrolysis technologies.

Likewise, the system for producing electric energy and hydrogen can be used with any type of renewable energy or a combination thereof.

BACKGROUND OF THE INVENTION

As it is known, occasionally wind turbines connected to the electricity network cannot inject all the electric energy produced to said electricity network due to technical or legal limitations. Therefore, for the purpose of profitably using the energy that is being produced, one of the uses thereof is the generation of hydrogen by means of an electrolyzer, in order to subsequently use the hydrogen produced and stored in different ways.

One of the uses can be the distribution of hydrogen to the hydrogen distribution stations, for use thereof as a fuel in vehicles or the selling of hydrogen itself.

Likewise, another possible use is the utilization of said hydrogen to produce electricity and inject it again into the electricity network.

There are numerous publications that set forth systems that integrate the generation of renewable energy and hydrogen.

As to the production of electricity with hydrogen coming from wind energy, there are patent applications such as: WO2006097494 and EP1596052, that propose generating hydrogen by electrolysis, that would be later used to produce energy by conventional gas or steam plants.

Furthermore, DE10055973 describes a system for producing and storing hydrogen with wind energy, for the purpose of using it to produce electricity and inject it in the wind turbine power outlet, in order to adjust the power output of the wind farm.

Finally, there are publications, such as U.S. Pat. No. 7,199,482 that describes the regulation of power of a wind farm by means of increasing or decreasing the power consumption of an electrolyzer.

Nowadays, the main and most developed technologies, as far as electrolyzers are concerned, are Proton Exchange Membrane (PEM) technology and alkaline technology.

PEM technology is comprised of a solid electrolyte and has rapid operating dynamics, though there are no current devices with a lot of power. Generally, they tend to be around tens of kilowatts.

Alkaline technology consists of an electrolyte, normally, diluted KOH, that has slower dynamics than PEM technology, but there are more powerful electrolyzers with this technology. They can even produce up to megawatts.

These technologies have been tested in different projects, such as the one led by NREL "Renewable Electrolysis Integrated System Development and Testing" and the one led by IEA "Solar-Wasserstoff-Bayern Hydrogen Demonstration Project".

Notwithstanding, none of these techniques is adequate, in itself, in order to be combined with wind energy installations. The cause of this problem is that wind has very rapid dynamics and thus, the generated wind power also has said rapid dynamics.

Besides, taking into account that the energy of a wind farm is typically several tens of megawatts, providing electrolyzers of a single technology would not meet the requirements of the system as far as the required power and dynamics are concerned.

On the other hand, more and more attention is being paid recently to issues connected with energy production, such as energy dependence on fossil fuels, gas emissions coming from the greenhouse effect, environmental pollution, impact on climatic change, and, stated briefly, the sustainability of the existing energy systems.

In this context, renewable energies have become the key factor, since they provide society with energy to meets its needs upon using renewable, sustainable and non-polluting sources as the primary energy.

The disadvantage of these technologies generating electricity from renewable sources with respect to traditional technologies, is the variability in the availability of the renewable energy resource, namely wind or solar energy. Therefore, the management capacity of said energy is limited.

Currently, as a result of these limitations, electricity network operators are imposing restrictions on the introduction of new renewable energy generating plants, such as wind farms or photovoltaic power plants.

In order to avoid these restrictions and to get the renewable electricity generation plants to penetrate into the grid system, it is necessary to provide solutions that make it possible to make these sources of energy more manageable.

A novel system for producing electricity and hydrogen is presented as a solution to these above-described problems.

The present invention includes a hybrid device of different electrolysis technologies with different dynamic responses that allow absorbing the fluctuations of the generated electric power due to the variability of the wind source, to be absorbed. The fluctuations of the electric power injected to the electricity network are reduced and/or eliminated.

Another advantage of the invention is that by means of the use of electrolyzers of different technologies, the needs of the system are covered as far as the required power and dynamics are concerned.

Besides, the overall process is improved since there are several electrolyzer technologies that provide different characteristics that can be used as required. An additional advantage of the use of the hybrid electrolyzer device with different dynamics is that the electrolyzers can function as loads of a different power range in each moment and with different dynamics. Thus, they can be used to regulate the output power of the wind farm or wind turbine in particular.

Another advantage is that the use of two electrolyzer technologies with different response dynamics and power capacity permits the control of the frequency of the electric system. The rapid dynamic technology acts as a controlled primary power reserve (in the range of seconds) and the slow dynamic technology acts as a controlled secondary power reserve (in the range of minutes).

Due to the use of two different electrolysis technologies, with different response dynamics and power capacity, it is possible to adapt the electric power, which is injected to the electricity network, to the plant management requirements indicated by the electric system operator, such as the active power reserve, reactive power adjustment, voltage dip control, as well as primary and secondary regulation power control.

Therefore, an invention that makes it possible to solve the problems derived from the variability of the wind source is disclosed. It considerably increases the management capacity of the wind farm, in such a way that it permits it to operate in a way similar to that of conventional power generation stations, meeting all the requirements of the electricity network operators. Besides, in this way, a contribution is achieved to increasing the penetration of renewable energies in the electricity network.

DESCRIPTION OF THE INVENTION

According to the revised state of the art, the present specification describes a system for producing electric energy and hydrogen based on the profitable use of wind energy from one or more wind turbines. The system includes hydrogen production means (electrolyzers) in such a way that the system comprises a hybrid electrolyzer device made of the combination of, at least, two different electrolysis technologies and, at least, one control device that manages the hydrogen production among the electrolyzers of a different type of technology, and/or the consumption of the electrolyzers in order to meet the requirements established by the electricity network. In this way, the electrolyzers are of a first type of technology with fast response dynamics and of a second type of technology with a substantially slower response dynamics. The electric energy consumed by the hybrid electrolyzer device is regulated to absorb fluctuations of the generated electric energy, thus reducing and/or eliminating power fluctuations injected to the electricity network.

Hence, the hybrid electrolyzer device is comprised of the combination of, at least, one electrolyzer of each type of electrolysis technologies.

Likewise, the system can include one or more control device(s) that distribute the hydrogen production among the electrolyzers of a different type of technology. Said control device(s) can be integrated in the hybrid electrolyzer device or placed independent from it.

The use of a hybrid electrolyzer device with different responses dynamics and power capacity allows the electrolyzers to be operated as controlled loads of different power ranges at each moment and with different dynamics. They can be used to regulate the power output either from the whole wind farm or from individual of a wind turbine, or a plurality of wind farms.

Hence, by means of electrolyzers with a different type of technology, concerning the hybrid electrolyzer device, the power of the system is managed and the output power of the system is independent from the output power of the wind turbine(s).

Likewise, the distribution of the production and suitable variation of the operating demand of the rapid dynamics electrolyzer and of the slow dynamics electrolyzer makes it possible for the assembly to take part in the frequency control of the electric system. The rapid dynamics technology acts as a primary power reserve (in the range of seconds) and the slow dynamic technology acts as a secondary power reserve (in the range of minutes).

In other words, the hybrid electrolyzer device makes it possible to have a first active power reserve based on the power consumption of the electrolyzer(s) with a rapid dynamics technology, and a second active power reserve based on the power consumption of the electrolyzer(s) with substantially slower dynamics technology.

Given that a rapid dynamics technology permits faster variations of its load but with a lower power capacity, said first active power reserve will be used for primary regulation of power output reserve. The rapid dynamics electrolyzers will act as a fast controlled load, either increasing or decreasing load according to frequency control requirements of the network operator.

On the other hand, substantially slower technology electrolyzer(s) feature, with higher power capacity but with a lower load variation will be used as a second power reserve. Said second active power reserve will perform the secondary regulation of power output, according to frequency control requirements of the network operator.

The hybrid electrolyzer device can include other energy converting means that make use of the produced hydrogen to generate electricity, either by hydrogen alone or by a combination of fluids/gases including hydrogen, either by combustion, mechanical and/or hydraulic conversion or else by other energy conversion systems. The electricity generated by the energy converting means is then injected to the wind power system outlet and/or to the electricity network.

On the other hand, the energy converting means can be fuel cells, internal combustion engines and/or gas turbines that use hydrogen to generate electricity.

At least, one of the electrolyzers of the hybrid electrolyzer device can be reversible, i.e. having the capability to produce energy, functioning, acting as a power generator.

Besides, the conversion process from hydrogen to electricity also generates a heat flow. Hence, the produced heat can be employed for water heating, to produce thermal energy by a heat exchanger and/or to produce cooling energy by an absorption machine during the electricity production process in the energy converting means.

Hence, the efficiency of the system can be increased due to the higher performance of the fuel cells and with the inclusion of a cogeneration system.

Likewise, the system can include a desalination plant where part of the produced water is utilized to charge the hybrid electrolyzer device. This is especially relevant for offshore applications, both close to the shore as well as far from it, in such a way that in areas close to the shore the water can be used for consumption.

If the generating power of the wind system is higher than the feeding power capacity of the electricity network, the excess energy is used to produce hydrogen.

The power control and power electronics associated to the hybrid electrolyzer device and energy converting means, provide the wind farm or wind turbine(s) with the capability to start up in the absence of voltage from the electricity network, by means of synthesizing a reference voltage and a dedicated energy supply to the starting elements.

The possibility to start up in the absence of voltage in the electricity networks is also called "blackstart capability" and is determined by the energy requirements for the wind farm operation. This conditions its capacity to energize an electricity network that has lost voltage.

This possibility proves to be very interesting, for example, to contribute to the recovery of power a system that may have undergone a contingency leading to the total loss of energy therein.

The flexibility of wind energy in order to rapidly vary its production makes it very appropriate for this purpose, since rapid power variations within the plants connected at such time arise during first instants of re-energization of the electricity network and must be modulated.

The control device(s) of the hybrid electrolyzer device allow for variables that influence the performance of each one of the electrolyzers that comprise it, such as temperature of the electrolysis module, room temperature and/or electrolyte concentration, or all those that influence the performance and life-cycle of the electrolyzers. This is a mean to optimize the performance of the hybrid electrolyzer device.

The power electronics associated to the hybrid electrolyzer device is utilized to generate or consume reactive power. In this way, the current waveform supplied or absorbed has the adequate phase difference with respect to the voltage waveform, thus coping with supplying or absorbing reactive power to/from the electricity network as a function of the control target.

Power electronics associated to the hybrid electrolyzer device is utilized to carry out a dynamic voltage control at the point of connection by means of the generation or consumption of reactive power.

In case of a voltage dip in the electricity network, the power electronics associated to the hybrid electrolyzer device contributes to a fast voltage recovery by rapidly injecting of reactive power. In this way, progressive variations of the voltage are guaranteed and use of the components with various aims is shared, thus reducing the amortization costs thereof.

In case of a contingency in the electricity network, the hydrogen production of some electrolyzers within the hybrid electrolyzer device is interrupted, and the full capacity of its power electronics is utilize to collaborate in the restoring the electricity network.

In contrast, today most wind farms rely on the power supply from the electricity network to maintain active all auxiliary and control systems that allow the connection with the electricity network and the export of the produced energy. Therefore, they are not capable of operating in a network without a voltage source.

Consequently, by utilizing the power electronics of the hybrid electrolyzer device and/or other plant's converting means, it is possible to provide enough energy to the auxiliary systems to start operation, as well as to synthesize the voltage signal needed in each instant for a correct recovery of the system by supplying or absorbing reactive power depending on which is required.

Likewise, hybridizing the electrolysis technology increases the flexibility of the entire system providing stability of the recovery.

The power electronics associated to the hybrid electrolyzer device can be integrated in the power electronics of wind turbine.

The electrolyzer(s) related to hybrid electrolyzer device of fast response dynamics technology can be of Proton Exchange Membrane (PEM) technology.

The electrolyzer(s) related to the hybrid electrolyzer device of the substantially slower response dynamics technology can be of alkaline technology.

The hybrid electrolyzer device can comprise any combination of electrolyzers of different technologies that are series and/or parallel connected.

All that which has been described above can be used in autonomous power systems, i.e. isolated from the electricity network, in such a way that hybridizing the electrolyzer technology facilitates managing the isolated system as well as to make the system more efficient.

In this same way, all that which has been described in the present invention is valid for any type of renewable energy source or combination thereof, such as medium or high temperature thermoelectric solar energy (such as systems concentrating solar energy in parabolic troughs, reflector mirrors, and focal-point systems such as dishes and heliostats), photovoltaic solar energy, hydraulic energy, tidal energy, wave energy, sea current energy, geothermal energy, and wind energy onshore as well as offshore.

In order to complete the description that is going to be made hereinafter and for the purpose of providing a better understanding of the characteristics of the invention, a set of drawings is attached to the present specification. The figures represent the most characteristic details of the invention in an illustrative and non-restrictive manner.

DESCRIPTION OF A PREFERRED EMBODIMENT

Figure 1:
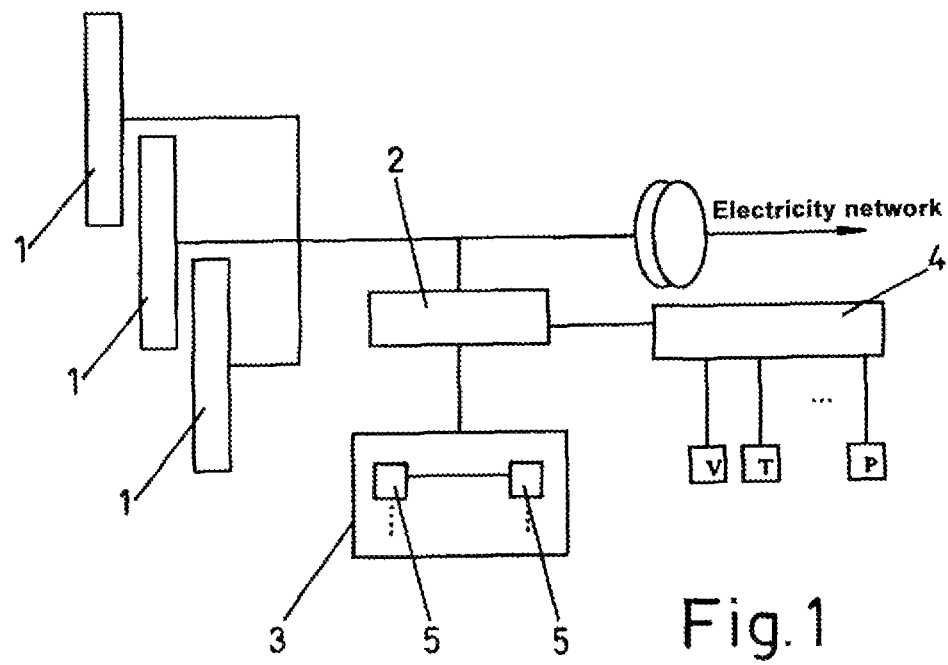
FIG. 1 shows a general diagram of the system object of the invention, where a number of wind turbines, the hybrid electrolyzer device, and associated power electronics and control device are illustrated.

In view of the previous figures and according to the numbering used, it can be seen how, in general, as represented in FIG. 1 of the diagrams, a system for producing electric energy and hydrogen can be comprised of, at least, one wind turbine (1) connected by power electronics means (2) to the hybrid electrolyzer device (3). This device is comprised by at least one rapid dynamics technology electrolyzer and a substantially slower dynamics technology electrolyzer. It is controlled by the control device (4).

Thus, the system includes a hybrid electrolyzer device (3), which is made of the combination of, at least, one electrolyzer (5) and (6) of two different electrolysis technologies and a control device (4) that distributes the production of hydrogen between the different technology type of electrolyzers (5) and (6). This is done in such a way that the electrolyzers (5) are of a first type of technology with rapid dynamics and the electrolyzers (6) are of a second type of technology with substantially slower dynamics. The electric energy consumed by the hybrid electrolyzer device (3) is adapted to absorb fluctuations of the generated electric power, hence reducing or eliminating the fluctuations of electric power injected to the electricity network.

The approach for distributing the hydrogen production between the different electrolyzer technologies is based on consigned sudden power variations to the rapid dynamics technology, and gradual power variations to the substantially slower dynamics technology.

Figure 8:
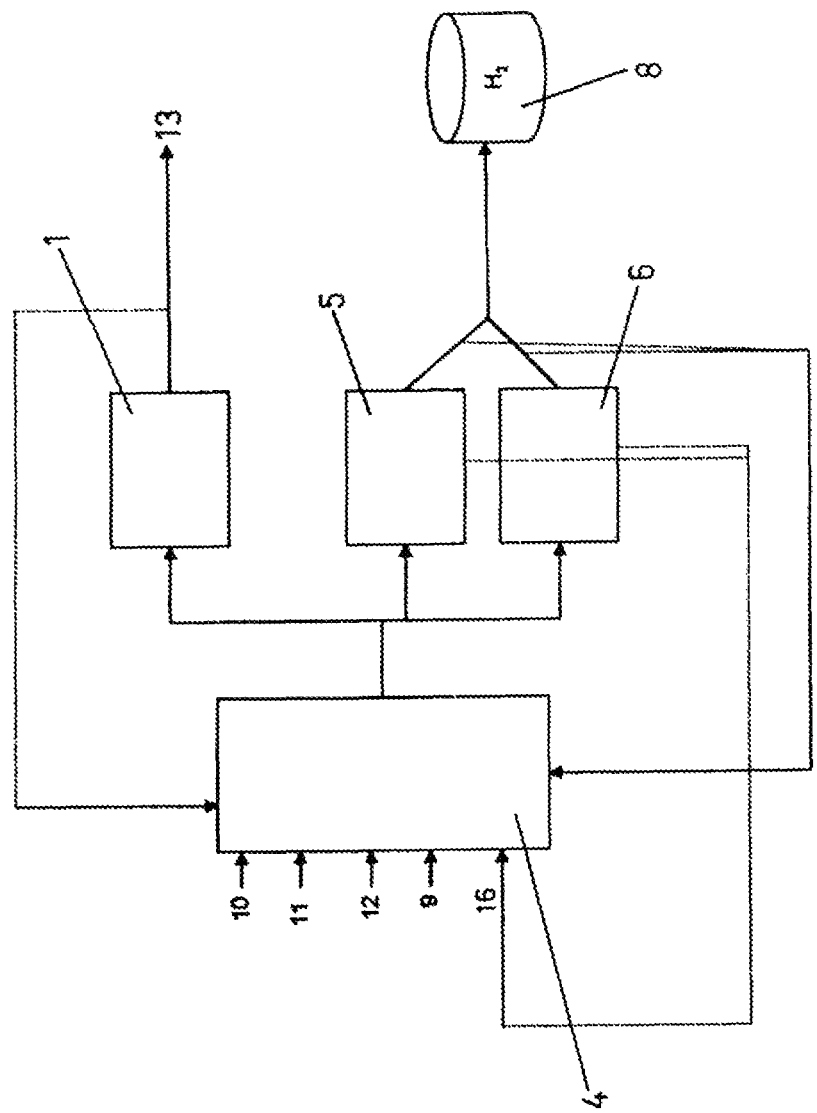
FIG. 8 shows a general system control diagram.

As it can be seen in FIG. 8, the control device (4) takes the state variables (9) of the electrolyzers into account. The variables influence the performance and life-cycle of the electrolyzers when the hydrogen production is distributed between the rapid dynamics electrolyzer(s) (5) and the substantially slower dynamics electrolyzer(s) (6) for the purpose of maintaining the life-cycle thereof and to maximize the performance thereof. Furthermore, the control device (4) ensures that the limits of maximum power export to the electricity network released (10) and maximum hydrogen production, determined by the maximum power (11) of each electrolyzer, are not exceeded. In turn, the control device (4) receives production targets (12) (electricity and/or hydrogen) determined by internal criteria (elimination of fluctuations at the wind farm point of connection) or by operating requirements of the electricity network (primary/secondary power reserves). The control device (4) can also take other demands (16) into account. With this input, the control device (4) distributes energy between the energy injected as an electrical vector (13) and the energy for hydrogen production (8) which is subsequently distributed between the rapid dynamics electrolyzer(s) (5) and the substantially slower dynamics electrolyzer(s) (6) as a function of the power exchanged in the wind farm. Furthermore, the control device (4) takes into account the energy injected as an electrical vector (13) and the hydrogen produced in each electrolyzer as a feedback loop.

Figure 9:
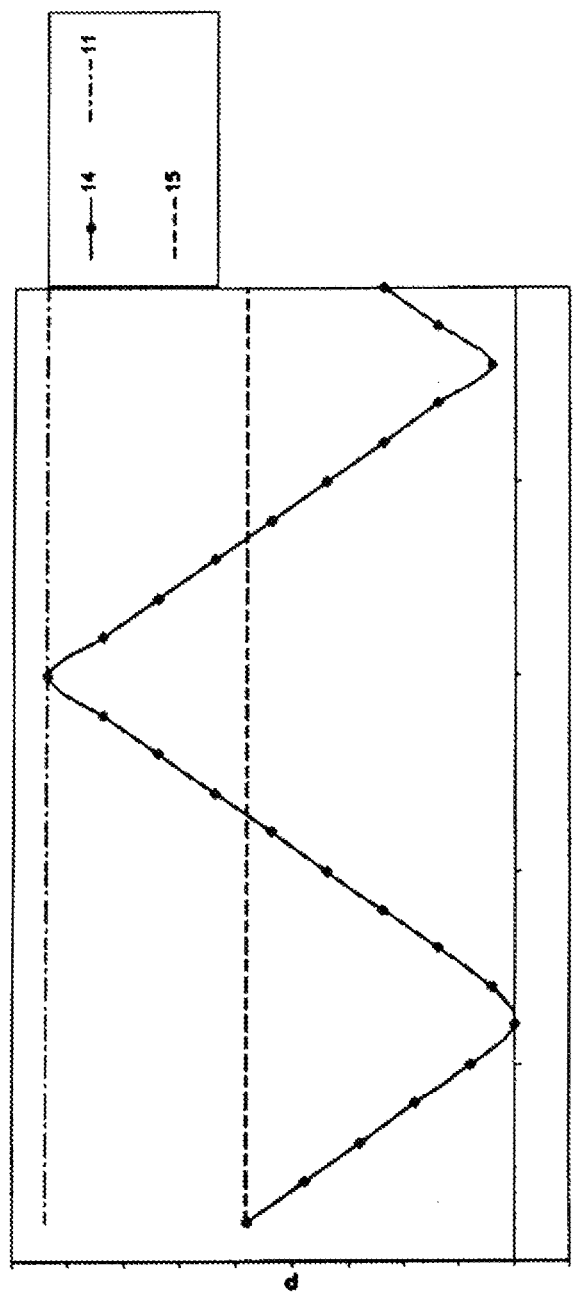
FIG. 9 shows secondary regulation power control.

As seen in FIG. 9, a "power reserve" is created with the production (14) of the substantially slower dynamics electrolyzer by means of establishing an average production demand (15) lower than the maximum power of the substantially slower dynamics electrolyzer (11). This power reserve provides a regulating range that allows the electrolysis device to adjust its production in such a way that it contributes to the secondary frequency control of the electricity network.

Figure 10:
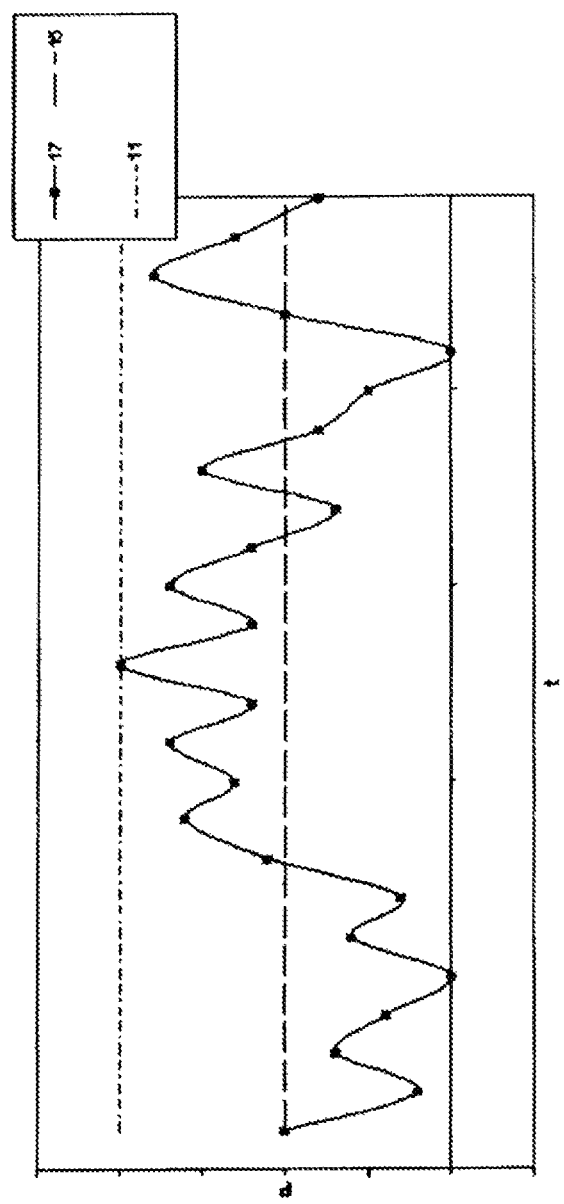
FIG. 10 shows primary regulation power control.

As seen in FIG. 10, a "power reserve" is created with the production (17) of the rapid dynamics electrolyzer by means of establishing an average production demand (15) lower than the maximum power of the rapid dynamics electrolyzer (11). This power reserve provides a regulating range that allows the electrolysis device to adjust its production in such a way that it contributes to the primary frequency control of the electricity network.

Figure 11:
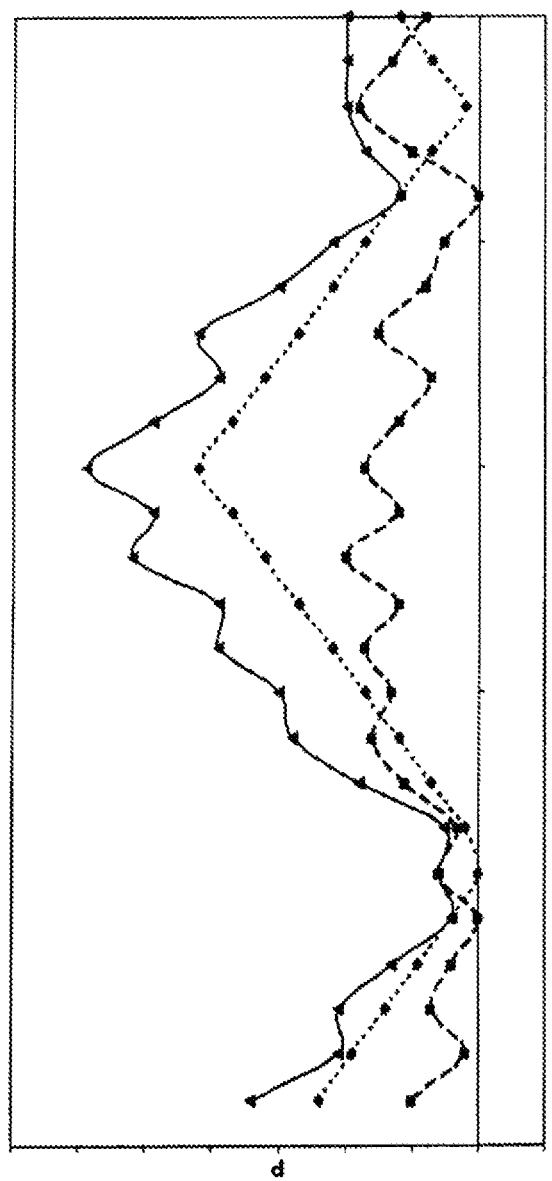
FIG. 11 shows total regulation power control.

The results of the combined production of the rapid dynamics electrolyzer and of the substantially slower dynamics electrolyzer is illustrated in FIG. 11.

Figure 12:
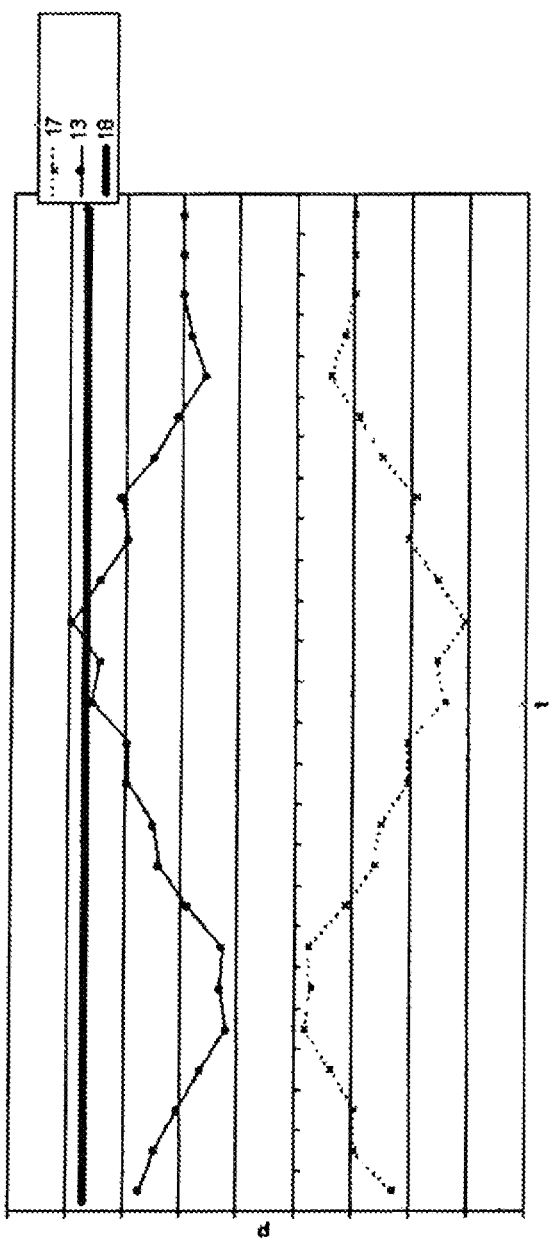
FIG. 12 shows combined power control regulation of electrolyzers vs. the electricity production of a wind farm.

FIG. 12 shows how the combined regulation carried out by the rapid dynamics electrolyzer and by the substantially slower dynamics electrolyzers allows the system to provide a reciprocated combined response (17) with greater variability. Together with an electric production of the wind turbine park (18) and together with the needs of the system, an output of the overall energy production (13) adapted to the requirements is produced.

These variations of the operating target of the rapid dynamics electrolyzer and the slow dynamics electrolyzer allows the system to participate in the frequency control of the electricity network system. The rapid dynamics technology acts as a primary power reserve (in the range of seconds) and the substantially slower dynamics technology acts as a secondary power reserve (in the range of minutes).

In a preferred embodiment, the rapid dynamics electrolyzers are of PEM (Proton Exchange Membrane) technology and the substantially slower dynamics electrolyzers are of alkaline technology.

In other words, the hybrid electrolyzer device with different type of technology makes it possible to have an active power reserve based on the electric consumption of the PEM and alkaline technology electrolyzers. The PEM active power reserve will carry out the primary regulation whilst the alkaline active power reserve will carry out the secondary regulation.

The control device (4) will manage the hydrogen production as a function of the requirements of the electricity network operator or the internal requirements of the wind farm either increasing or decreasing the hydrogen production of the electrolyzers of the hybrid electrolyzer device in such a way that, on the one hand, the fluctuations of power injected to the electricity network are eliminated and, on the other hand, an active power reserve is maintained. This reserve is utilized to respond to the electricity network operator's primary and secondary regulation requirements at all times.

In order to implement this mode of operation, the active power output of the wind farm will be lower than the export power capacity of the wind farm. In this way, an active power reserve is guaranteed. This reserve will be managed by the control device (4) in such a way that the power resulting from adding up the active power reserve and the variable power above the export capacity of the wind farm will be distributed between the electrolyzers of different technology within the hybrid device, in accordance with the above-mentioned criteria.

The power output of the system is managed by means of the different type of technology electrolyzers (5) and (6), concerning the hybrid electrolyzer device (3). The output power of the system is independent from the output power of the wind turbine(s).

The hybrid electrolyzer device (3) can include energy converting means (7) that utilize the produced hydrogen (8) to generate electricity and inject it to the power outlet of the wind system and/or electricity network.

The energy converting means (7) can be fuel cells, internal combustion engine and/or gas turbine that utilize the generated hydrogen to produce electricity and inject it to the power outlet of the wind system and/or electricity network.

Figure 2:
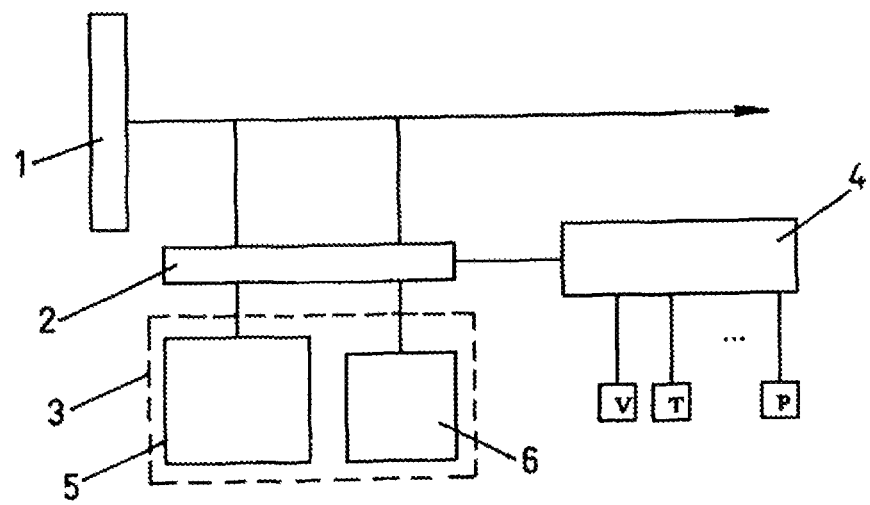
FIG. 2 shows a diagram of the system object of the invention provided with several electrolyzers and a power converter that feeds the different electrolyzers of different dynamics.

In a preferred embodiment, as seen in FIG. 2, the electrolyzers (5) and (6) of different type of technology and dynamics are fed by power electronics converter means (2) common to all the electrolyzers. The entire system is controlled by a control device (4) that from the power generated by the wind farm or wind turbine (1), the wind measurements, the voltage at the point of connection (voltage control and voltage dip ride-through), system frequency (frequency control) and the operating characteristics of the electrolyzers (temperature of the electrolysis module, room temperature, pressure and/or concentration of the electrolyte), calculate the active power to be converted into hydrogen and the reactive power to be generated.

Said active power is distributed between electrolyzers (5) and (6) of different type of technology in terms of the characteristics of each electrolyzer and also in terms of the requirements electricity network the electric system.

The generation of reactive power is also distributed between the energy converting means (7). Under normal operating conditions, the capacity of said energy converting means (7) is preferably utilized to produce active power, reducing and/or eliminating fluctuations of the power injected to the electricity network. The remaining capacity can be utilized for generating reactive power.

However, in case of abnormal operating conditions of the electricity network, such as voltages or frequencies outside the normal operating ranges and voltage dips, the capacity of the power converter will be preferably utilized to support the recovery of the electricity network back to normal conditions.

Figure 3:
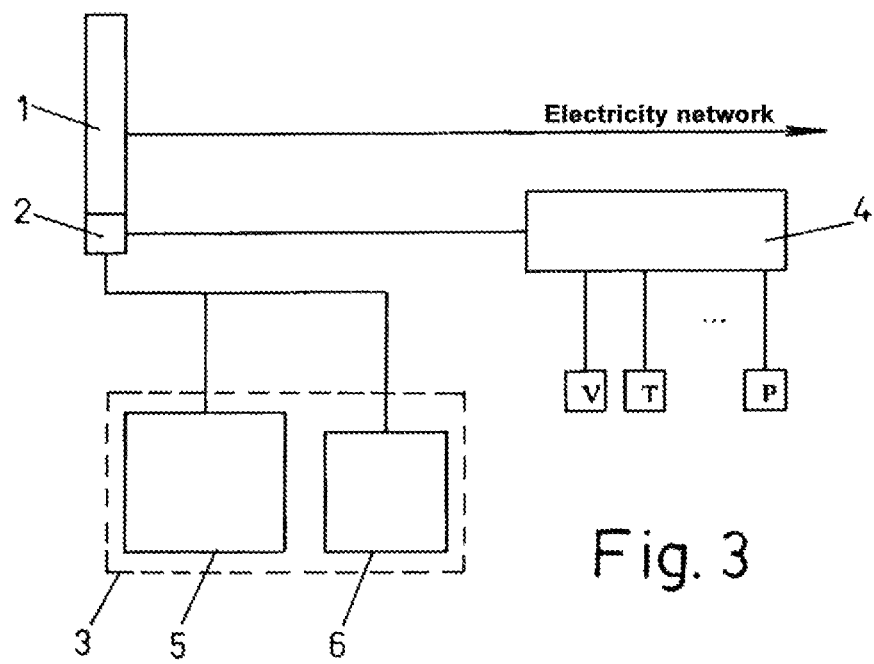
FIG. 3 shows a diagram of the system object of the invention provided with several electrolyzers and based, in this example, on a doubly fed generator with the power electronics converter on a continuous power output for the electrolyzers.
Figure 4:
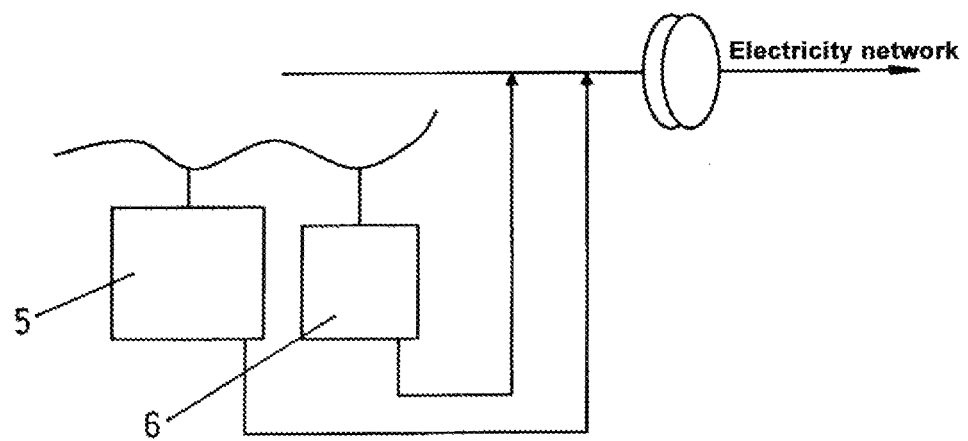
FIG. 4 shows a diagram of the system object of the invention provided with several electrolyzers with, at least, one reversible electrolyzer, hence, being able to inject energy to the electricity network.
Figure 5:
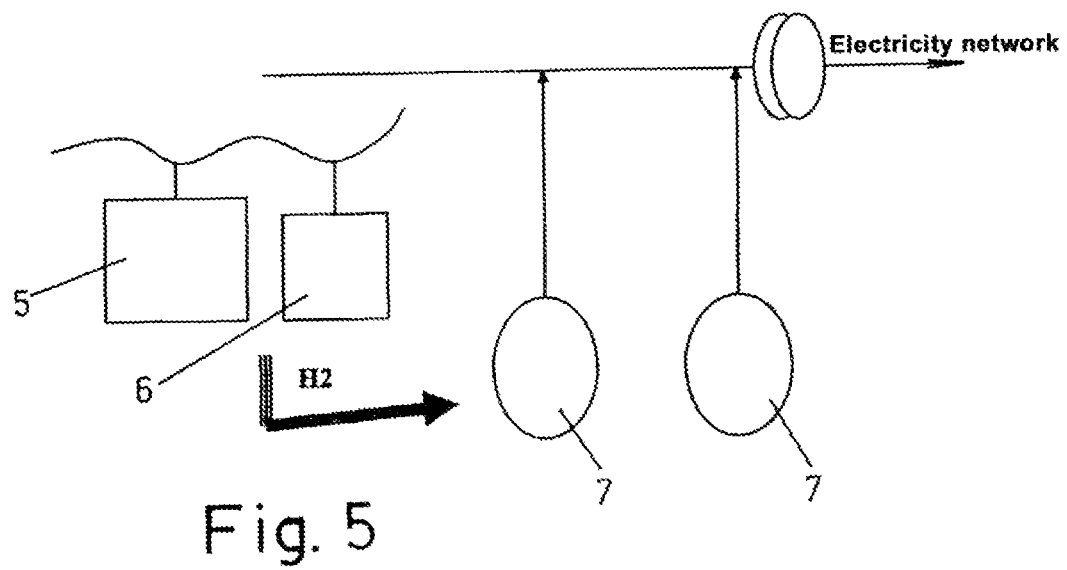
FIG. 5 shows a diagram of the system object of the invention provided with several electrolyzers and energy converting means based on hydrogen supply elements. They produce heat and power and the latter can be injected to the electricity network.

In a preferred embodiment, the power electronics (2) shared by the electrolyzers (5) and (6) of the hybrid electrolyzer device (3), makes use of the DC power output of a doubly fed induction generator (1), as shown in FIG. 3.

The doubly fed wind turbine is taken as a particular case; however notwithstanding, this embodiment can be realized with any type of wind turbine.

Likewise, any of the electrolyzers (5) and (6) within the hybrid electrolyzer device (3) is reversible and, therefore, in certain instances, it injects energy to the power outlet of the system to re-convert hydrogen into electric energy.

Similarly, the system includes elements (7) to convert hydrogen into electric energy, for which purpose these elements can inject the produced energy to the power outlet of the system.

Figure 6:
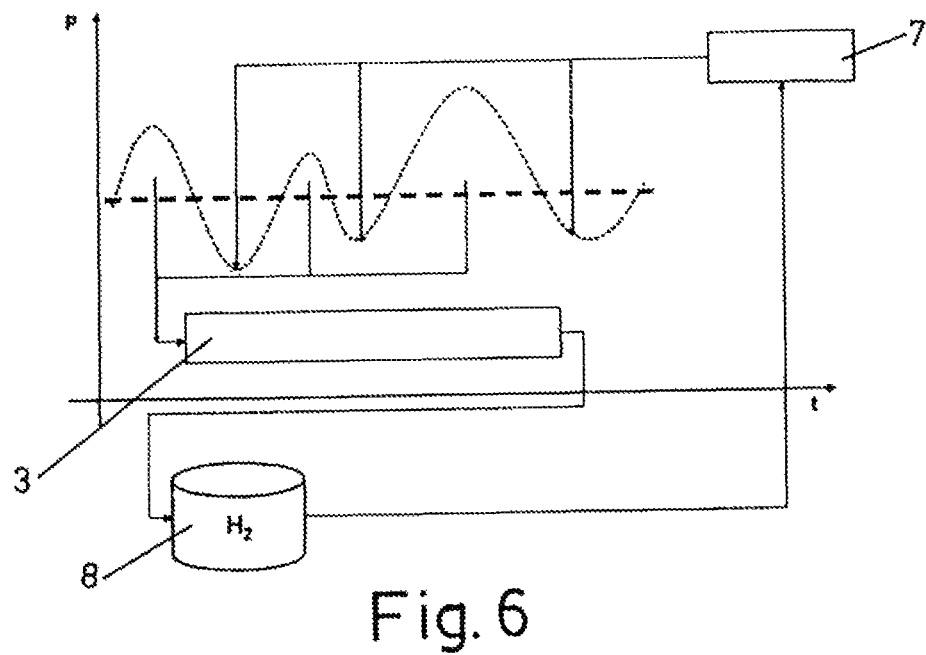
FIG. 6 shows an operating diagram of the complete system in instances when the electrolyzers operate as loads for regulating power output in periods of excess power. Correspondingly, the energy converting means supply energy when there is a deficit thereof.

On the other hand, the control device (4) can control the energy in such a way that, as observed in the diagram of FIG. 6, when excess energy is generated, it is utilized to produce hydrogen (8). Conversely, when there is not sufficient energy, the hydrogen is re-converted by the energy converting means (7) into electric energy. Thus, there is energy injected to the electricity network fully controlled by the system. This makes the hybrid electrolyzer device manageable.

In the process of electricity generation from the stored hydrogen (8) in converting means, the produced heat can be employed for water heating, by a heat exchanger in order to produce heat energy and/or an absorption device to produce cold.

The system can include a desalination plant, using part of the desalinated water to feed the hybrid electrolyzer device (3).

If the generated power of the wind system is higher than the export power capacity of the electricity network, the excess power is utilized to produce hydrogen, which implies an improvement of the profitability of the system and a greater profitable use of the wind resource.

The control system and power electronics associated to the hybrid electrolyzer device (3) and the energy converting means (7), provides the wind system with the capacity to start operating in the absence of voltage in the electricity network, by means of synthesis of a reference voltage and energy supply to the starting elements.

Likewise, system variables that influence the performance of each of the electrolyzers, such as the temperature of the electrolysis module, room temperature, pressure and/or concentration of the electrolyte, are included in the control device of the hybrid electrolyzer device (3).

The power electronic device (2) associated to the hybrid electrolyzer device (3) are utilized to generate or consume reactive power, in such a way that the current waveform has the proper phase difference with respect to the voltage waveform for the appropriate power transfer. Thus, reactive power is injected or absorbed to/from the electricity network as determine the control reference.

Similarly, the power electronic means (2) associated to the hybrid electrolyzer device (3) are used to carry out a dynamic voltage control in the point of connection by the injection or consumption of reactive power into the electricity network.

In case of contingency in the electricity network, the power electronics (2) associated to the hybrid electrolyzer device (3) collaborates to a fast voltage recovery by rapidly generating reactive power. The production of hydrogen of some electrolyzers within the hybrid electrolyzer device is interrupted, and the full capacity of the power electronics converters is utilized for restoring the electricity network.

Hence, as previously indicated, the possibility to start up in the absence of voltage in the electricity network, also called "blackstart capability", is determined by the energy requirements of the wind farm operation. The capacity thereof to energize an electricity network that has lost voltage is conditioned.

This possibility proves to be of great interest, for example, to contribute to the recovery of a power system that may have undergone a contingency leading to the total loss of energy therein. The flexibility of wind energy to rapidly vary the production thereof makes it very appropriate for this purpose, since rapid power variations within the plants connected at such time arise during the first instants of re-energization of the electricity network and must be modulated.

Figure 7:
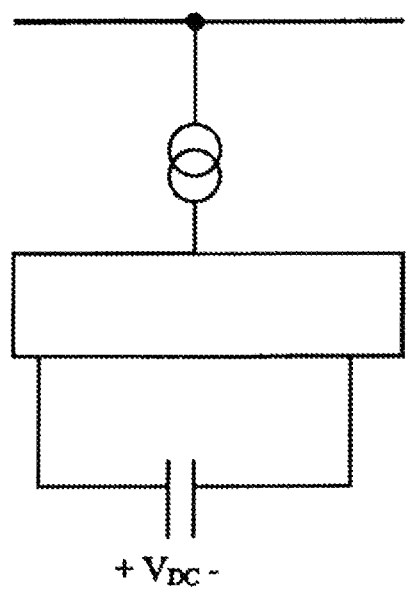
FIG. 7 shows a diagram of a direct current source and power electronic converter of a STATCOM (Synchronous Static Compensator).

The power electronics (2) of the hybrid electrolyzer device (3) may include capabilities similar to a STATCOM "Static Synchronous Compensator", enveloped on power electronics equipment for voltage control, which normally comprise a direct current (DC) source and a power converter, according to the diagram shown in FIG. 7.

This designation comes from its functionality which is, similar to a synchronous condenser (a rotating device) but having its static characteristics as an advantage with respect to the latter. In other words, it does not include any rotating elements but rather only power electronics components, and having no inertia it is capable of responding much faster than a synchronous condenser for the purpose of providing:

Dynamic voltage control: By injecting reactive power according to the control command of the device, the voltage of the electricity network is dynamically regulated (to the desired value and not discretely as in the case of condenser/inductor batteries) target level.

Power oscillation damping: The rapid response of the device and its capacity to store active energy in the DC circuit allows operation during system faults, damping out the variations and helping the system recovery.

Improvement of the dynamic voltage margin: The greater control over the voltage allows broadening the acceptable margin from the point of view of dynamic voltage security, since it reduces the necessary security margin.

Reactive and active power control: By converting alternating current (AC) into direct current (DC) and vice versa, it is possible to control the reactive power generation in order to regulate voltage at the point of connection and store active energy in the DC side of the device.

In the standard design of this equipment, a condenser is used as a current source which is charged through the power electronics converter up to the target level.

The energy storage is limited by the capacity of the condenser in this device; therefore it is only possible to utilize it as a buffer of small amounts of energy. Besides, the high cost of the associated power electronics constrains the profitability of the commercially available solutions and their implementation.

However, the utilization of the power electronics associated to the hybrid electrolyzer device and the energy converting means in the proposed solution would make possible increasing the volume of active power storage as hydrogen, and reducing the specific cost of power converters by distributing it among different equipment.

All that has been described above can be applied in power systems isolated from the electricity network, in such a way that hybridizing the electrolyzer technology facilitates managing the isolated system as well as to make the system more efficient.

Finally, it can be indicated that everything referred to wind energy system is applicable to any other type of renewable energy system.

In this way, among the different types of renewable energy systems, besides onshore and offshore wind energy, that can be adapted to produce electricity and hydrogen include the following:
- Medium or high temperature solar systems such as systems concentrating solar energy in parabolic troughs, reflector mirrors, and focal-point systems such as dishes and heliostats;
- photovoltaic solar energy;
- hydraulic energy;
- tidal energy;
- wave energy;
- geothermal energy, and;
- sea current energy.

The invention claimed is:

1. A system for producing electric energy and hydrogen based on renewable energy sources, the system being connectable to renewable energy sources and an electric grid, wherein the system comprises:
a power electronics device, a hybrid electrolyzer device and at least one control device connected to the hybrid electrolyzer device; such that the hybrid electrolyzer device comprises a combination of at least two electrolyzers of different electrolysis technologies and being at least one electrolyzer of a rapid dynamics electrolysis technology type and, at least the second one of a substantially slower dynamics electrolysis technology type; and such that the control device, based on at least requirements established by the electric grid and the dynamic electrolysis technology type of said at least two types of electrolyzers, manages the power electronics device so that an electric energy consumption and a production of hydrogen of each one of said electrolyzers of the hybrid electrolyzer device is regulated for absorbing power fluctuations of a generated electric energy from renewable energy sources.

2. A system for producing electric energy and hydrogen, according to claim 1, wherein the hybrid electrolyzer device further comprises converting means for converting the produced hydrogen into electricity and for injecting said electricity to the wind power system outlet or to the electric grid.

3. A system for producing electric energy and hydrogen, according to claim 2, wherein the converting means are one option selected from the group consisting of fuel cells, internal combustion engines and gas turbines.

4. A system for producing electric energy and hydrogen, according to claim 3, wherein the system comprises a heat exchanger for producing heat energy and an absorption device for absorbing heat energy from heat generated within the converting means.

5. A system for producing electric energy and hydrogen, according to claim 2, wherein the system comprises a heat exchanger for producing heat energy and an absorption device for absorbing heat energy from heat generated within the converting means.

6. A system for producing electric energy and hydrogen, according to claim 1, wherein at least one of the electrolyzers of the hybrid electrolyzer device is reversible, with the capability to produce electricity, as converting means, and so functioning as a power generator.

7. A system for producing electric energy and hydrogen, according to claim 6, wherein the system comprises a heat exchanger for producing heat energy and an absorption device for absorbing heat energy from heat generated within the converting means.

8. A system for producing electric energy and hydrogen, according to claim 1, wherein the system comprises a desalination plant that feeds desalinated water to the hybrid electrolyzer device, wherein the desalination water provides at least part of the necessary water for the electrolysis reaction.

9. A system for producing electric energy and hydrogen, according to claim 1, wherein the control device takes into account system variables that influence the efficiency and the life-cycle of each electrolyzer, the system variables are selected from the group comprised by electrolyte module temperature, room temperature, pressure and electrolyte concentration.

10. A system for producing electric energy and hydrogen, according to claim 1, wherein the power electronic device provides the capability to a wind farm to start-up in the absence of voltage from the electricity network, by means of synthesizing a reference voltage and an energy supply.

11. A system for producing electric energy and hydrogen, according to claim 1, wherein the power electronic device comprises means for generating or absorbing reactive power.

12. A system for producing electric energy and hydrogen, according to claim 11, wherein, in the event of a contingency in the electricity network, the hydrogen production of at least one electrolyzer within the hybrid electrolyzer device is interrupted, and the full capacity of the power electronics device is utilized for restoring the electricity network.

13. A system for producing electric energy and hydrogen, according to claim 1, wherein the power electronic device comprises means for carrying out a dynamic voltage control at a wind farm point of connection between the wind farm and the electricity network.

14. A system for producing electric energy and hydrogen, according to claim 1, wherein the power electronics device generates reactive power to collaborate in a faster recovering of the voltage in the event of a voltage dip.

15. A system for producing electric energy and hydrogen, according to claim 14, wherein, in the event of a contingency in the electricity network, the hydrogen production of at least one electrolyzer within the hybrid electrolyzer device is interrupted, and the full capacity of the power electronics device is utilized for restoring the electricity network.

16. A system for producing electric energy and hydrogen, according to claim 1, wherein the power electronics device is comprised in a power electronics of a wind turbine.

17. A system for producing electric energy and hydrogen, according to claim 1, wherein at least one electrolyzer of the rapid dynamics technology type, within the hybrid electrolyzer device, is of Proton Exchange Membrane PEM, technology.

18. A system for producing electric energy and hydrogen, according to claim 1, wherein the at least one electrolyzer of the substantially slower dynamics technology type, within the hybrid electrolyzer device, is of alkaline technology.

19. A system for producing electric energy and hydrogen, according to claim 1, wherein the electrolyzers within the hybrid electrolyzer device are connected to each other by one option selected from the group consisting of a parallel connection, a series connection and a series/parallel connection.

20. A system for producing electric energy and hydrogen, according to claim 1, wherein the control device is comprised into the hybrid electrolyzer device.

21. A system for producing electric energy and hydrogen, according to claim 1, wherein the system comprises an active power reserve based on the power consumption of rapid dynamics electrolyzers, and alternatively on the power consumption of the substantially slower dynamics electrolyzers, and alternatively on the power consumption of rapid dynamics electrolyzers and slower dynamics electrolyzers.

22. A system for producing electric energy and hydrogen, according to claim 21, wherein a primary regulation power control is carried out by the active power reserve of the rapid dynamics electrolyzers.

23. A system for producing electric energy and hydrogen, according to claim 21, wherein a secondary regulation power control is carried out by the active power reserve of the substantially slower dynamics electrolyzers.

24. A system for producing electric energy and hydrogen, according to claim 21, wherein the control device of the hybrid electrolyzer device increases and alternatively decreases the active power reserves.

25. A system for producing electric energy and hydrogen, according to claim 24, wherein the active power reserve is adjusted according to internal wind farm requirements and alternatively requirements of the operator of the electricity network.

26. A system for producing electric energy and hydrogen, according to claim 1, wherein the control device varies the operating demand provided to the rapid dynamics electrolyzer in order to provide power from the primary power reserve to the electricity network in the range of seconds, hence contributing to system frequency control.

27. A system for producing electric energy and hydrogen, according to claim 1, wherein the control device varies the operating demand provided to the substantially slower dynamics electrolyzer in order to provide power from the secondary power reserve to the electricity network in the range of minutes, hence contributing to system frequency control.

28. A system for producing electric energy and hydrogen, according to claim 1, wherein the control device establishes set points for the production of hydrogen for the different technology electrolyzers in such a way that a power output of a wind farm is lower than a total export capacity of the wind farm.

29. A system for producing electric energy and hydrogen, according to claim 28, wherein an adjustment margin is provided to the system by the difference between the power output of the wind farm and a power export limit of the wind farm, in order to participate in the primary and secondary power reserve services demanded by the electricity network.

30. A system for producing electric energy and hydrogen, according to claim 1, wherein the control device establishes hydrogen production demands for the different technology electrolyzers lower than a maximum limit of hydrogen production, providing the system with an adjustment margin in order to participate in the primary and secondary power reserve services demanded by the electricity network.

31. A system for producing electric energy and hydrogen, according to claim 1, wherein the hybrid electrolyzer device is arranged in a power system isolated from the electricity network.

32. A system for producing electric energy and hydrogen, according to claim 1, wherein the renewable energy sources is a wind energy from at least one wind turbine.

* * * * *